Figure 1:
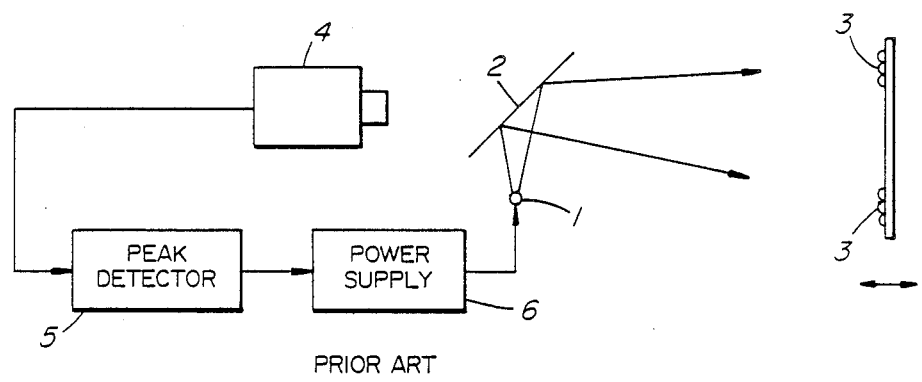

United States Patent [19]

Charlesworth et al.

[11] Patent Number: 4,931,866
[45] Date of Patent: Jun. 5, 1990

[54] DISTRIBUTED COAXIAL LIGHT SOURCE PRODUCING CONSTANT TARGET LUMINANCE

[75] Inventors: Arthur M. Charlesworth, Ottawa; Harold F. L. Pinkney, Nepean, both of Canada

[73] Assignee: Canadian Patents and Development Limited, Ottawa, Canada

[21] Appl. No.: 320,488

[22] Filed: Mar. 8, 1989

[30] Foreign Application Priority Data

Mar. 18, 1988 [CA] Canada .................................. 561918

[51] Int. Cl.$^5$ .............................................. H04N 7/18
[52] U.S. Cl. ..................................... 358/93; 358/475; 362/12; 362/13
[58] Field of Search ......................... 362/11, 12, 13; 354/126, 413, 145.1, 146, 290, 291; 358/93, 475; 355/35, 37, 38, 67, 69, 70, 71

[56] References Cited

U.S. PATENT DOCUMENTS

| 4,219,847 | 8/1980 | Pinkney et al. | 358/126 |
| 4,423,953 | 1/1984 | Burnham | 355/70 |
| 4,731,854 | 3/1988 | Gonzalez | 358/93 |
| 4,841,341 | 6/1989 | Ogawa et al. | 355/67 |

Primary Examiner—John K. Peng
Attorney, Agent, or Firm—Pascal & Associates

[57] ABSTRACT

A luminous source for illluminating targets in e.g. machine vision systems, remote manipulator systems used in outer space, etc., producing nearly constant target luminance as the target maintains various distances from the camera. This is achieved by the luminous source having a dual concentric ring shape of predetermined radii, intensity ratios and radial widths.

18 Claims, 2 Drawing Sheets

DISTRIBUTED COAXIAL LIGHT SOURCE PRODUCING CONSTANT TARGET LUMINANCE

This invention relates to a luminous source for illuminating targets for example in machine vision systems, such as those employed in robotic systems e.g. remote manipulator systems as may be incorporated on structures in outer space.

A target locating system uses a camera to receive radiation from a target, and a processing system for determining the location of the radiating target relative to a predetermined three dimensional axis in three dimensional space. The radiation usually is reflected from the target, and is provided by a radiation source, such as a light source, located in front of the target.

One of the most difficult problems faced by such systems is the relatively low level of incident flux reflected by uniformly diffusing matt surface targets. In order to solve this problem special pads or spots of retroreflective material are placed on the target, e.g. in an array, which reflect light back along the incident axis to the light source. The source is placed on the same axis as the camera lens. An electronic system senses the amount of light and controls the intensity of illumination in order to keep the received signal level within the dynamic range of the camera and at a suitable level with respect to its threshold voltage.

A system for determining the location of a target in a machine vision system is described in U.S. Pat. No. 4,219,847 issued Aug. 26th, 1980, and/or Canadian Patent No. 1,103,803 issued June 23rd, 1981, invented by Harold F.L. Pinkney and Charles I. Perratt. It has been found that the feedback system for controlling the illumination source is costly and has only a limited dynamic range. The present invention is a source of illumination which is capable of producing constant target luminance without the need for feedback control. This reduces complexity and weight of the system (the latter being particularly important in a space borne system), and can provide an increase in the camera video signal, a decrease in dimensions of the structure, and decreased costs. Since the illumination source can be operated at constant power, improved lamp life results, and with the elimination of large swings in scene luminance an improved sensor response time can result.

According to a preferred embodiment of the invention, a luminous source is provided for illuminating a target, comprising at least several luminous points symmetrically distributed in each of a pair of coaxial rings for mounting coaxially with a camera lens. The mean radius of an inner one of the rings is smaller than the mean radius of the outer one of the rings by a factor of about 1.6. The luminous intensity of the inner ring is lower than that of the outer ring by a factor of about 2.56, and the radial width of each of the rings is approximately equal to or smaller than 0.2 times the mean radius of the corresponding ring. Target luminance remains relatively constant for off-axis target positions across the camera field of view if the plane containing the source rings lies close to the plane containing the lens diaphragm. The target should be of retroreflective material.

By the use of the above structure nearly constant target luminance is observed with significant variation in target distance from the camera without the need for any feedback to the light source from the camera. An entirely uncoupled illumination structure is achieved.

Figure 2:
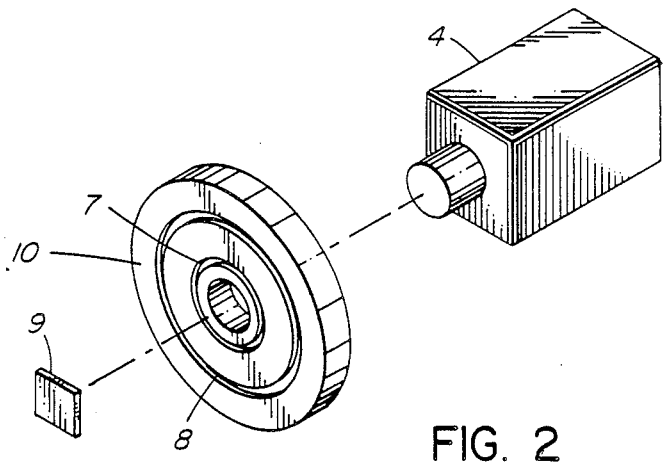
Figure 3:
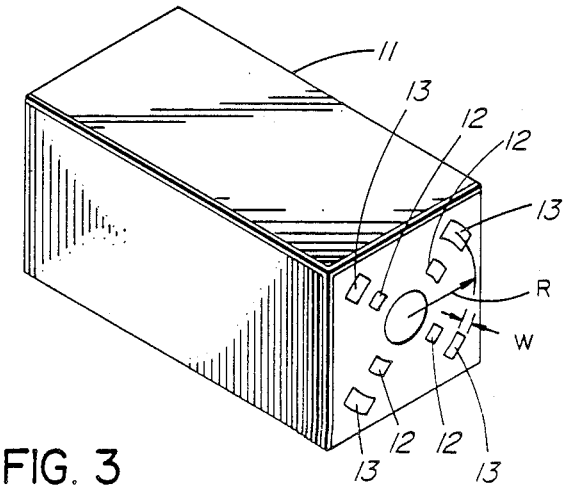
Figure 4:
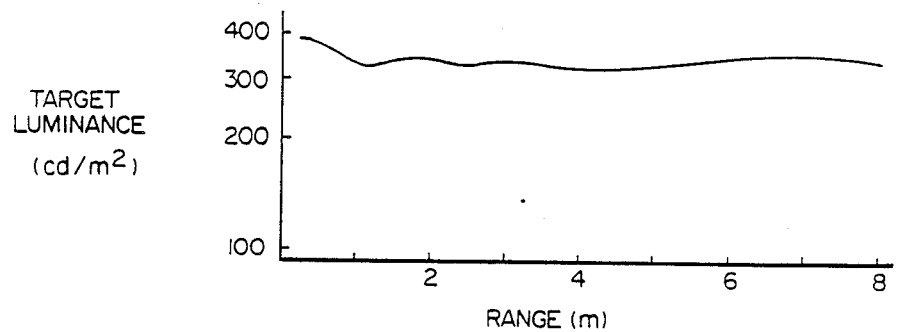
Figure 5A:
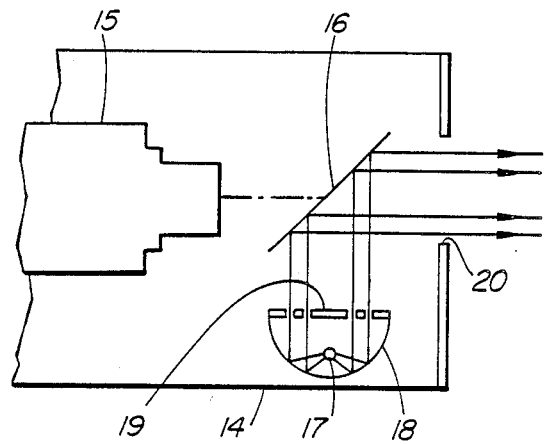
Figure 5B:
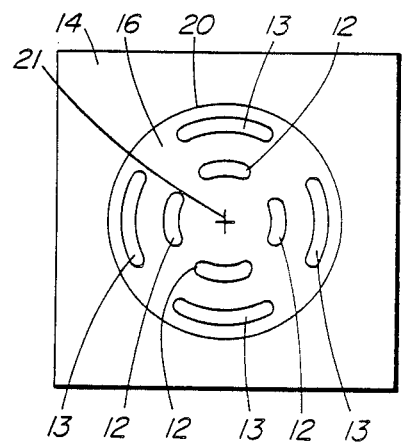
Figure 6A:
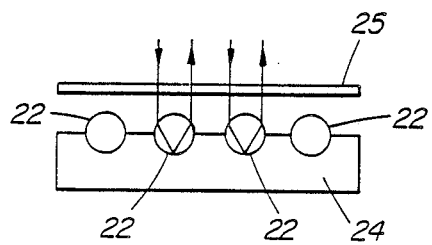
Figure 6B:
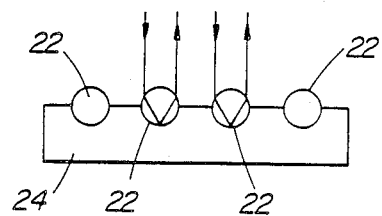

A better understanding of the invention will be obtained by reference to the detailed description below in conjunction with the following drawings, in which:

FIG. 1 is a block diagram of a system according to the prior art,

FIG. 2 is a schematic isometric view of one embodiment of the present invention of particular use in long range situations, FIG. 3 is an isometric view of another embodiment of the present invention designed for use in medium range applications, FIG. 4 is a graph showing the target luminance with range of the light source in accordance with the present invention, FIGS. 5A and 5B illustrate in side sectional view and front elevational view respectively another embodiment of the present invention of particular use in short range applications, and FIGS. 6A and 6B illustrate schematic sectional views of various kinds of retroreflective material that can be used as targets.

FIG. 1 illustrates an illumination system in a photogrammetry system in accordance with the prior art. In this system light from e.g. a 16 watt miniature halogen lamp 1 is deflected by a 50/50 beamsplitter 2 onto retroreflective targets 3 placed on an object. Light reflected from the targets is received in a video camera 4 through the beamsplitter 2. The camera scans the image of the target array, and since the retroreflective material returns the light maximally along the incident angle, the video output from the camera 4 rises from a background level to a peak reading corresponding to the maximum luminance observed at each target position. When the video signal crosses a threshold voltage level, scaling circuits designed to compute the centroid position of the target image are enabled (not shown). As the target object moves away from the camera the illumination at the target position decreases as the inverse square of the distance between them and the amplitude of the video signal falls off. For a fixed threshold level this drop in signal level can result in an undesirable shift in the calculated centroid position and, in the worst case, complete loss of the discriminated video signal.

In order to keep the signal level within the dynamic range of the camera, and at a suitable level with respect to the threshold voltage, a feedback control circuit is used to adjust the voltage applied to the lamp 1 to keep the peak video signal at a preset level. The feedback control circuit is comprised of a peak detector 5 for receiving the video signal and a power supply 6 which is controlled by the peak detector for powering the lamp 1.

In accordance with the present invention, the peak detector and variable power supply are not needed. In the present invention the luminous source is comprised, in the embodiment shown in FIG. 2, of a pair of concentric luminous rings 7 and 8 located effectively coaxially with the camera axis. The mean radius of an inner one of the rings 7 is smaller than the mean radius of the outer one of the rings 8 by a factor of about 1.6. The luminous intensity of the inner ring is lower than that of the outer ring by a factor of about 2.56. The radial width of each of the rings is approximately equal to or smaller than 0.2 times the mean radius of the corresponding ring.

In FIG. 2 a camera 4 views a target 9, formed of retroreflective material, through a hole which is on the axis of the rings 7 and 8. A housing 10 contains a lamp or lamps for illuminating the target 9. The rings 7 and 8 are formed of slits in the front face of the housing 10, with the housing portion between the rings and within the inner ring being supported by brackets or the like. The housing is of course closed around the periphery of the image axis within the inner ring.

FIG. 3 illustrates a second embodiment of the invention. In this embodiment a camera enclosure 11 itself contains the light source. FIG. 3 illustrates a particularly important aspect of the invention, which is that the luminous source need not be complete concentric rings, but may be luminous points distributed symmetrically around the camera axis. The luminous points can be round in shape, or, as shown in FIG. 3, can be short arc shaped sections of the rings. The arc shaped points of the inner ring 12 are shown symmetrically distributed around the camera axis, around which are located arc points of the outer ring 13.

The rings are defined by their mean radii, the radius R of the outer ring being marked in FIG. 3, their radial widths, the width of the outer ring being illustrated by the width W, and by their luminous intensities. The luminous intensities can be adjusted by providing separate lamps for the inner and outer rings, by filters, by the arc lengths of the rings used, by the specific radial widths used, or by a combination of the above.

To obtain constant target luminance the mean radius of the inner ring should be smaller than the mean radius of the outer ring by a factor of about 1.6. The luminous intensity of the inner ring should be lower than that of the outer ring by a factor of about 2.56 and the radial width of each of the rings should be approximately equal to or smaller than 0.2 times the mean radius of the corresponding ring. The useful operating range is determined by the mean outer ring radius R while the value of constant target luminance over this range depends on R and the total source intensity I. For example, the luminance produced in 3M 7610 material is given by $1.65 \times 10^{-2} I/R^2$ cd/m$^2$ which remains constant to $\pm 10\%$ over an operating range from 11R to 135R.

It has been found that (for a ⅔inch format CCTV camera with a 12.5 mm lens), if the plane of the source rings is within the distance R of the camera diaphragm, the luminance for off-axis targets out to at least $\pm 20°$ will be constant to about $\pm 10\%$. The closer the source rings are to the camera diaphragm, the further the target can be off-axis in order to have the luminance constant. If the plane of the source rings is greater than the distance R from the camera diaphragm, the target should be closer to the axis of the rings (eventually exactly on-axis, with greater distances) to obtain constant luminance.

FIG. 4 is a graph of measured target luminance with range between the target and the light source of a successful prototype. Using 3M 7610 material and for a mean outer ring radius of R=2.25 inches, it may be seen that from about 1 meter to in excess of 7 meters, the range measured, an almost constant target luminance is observed. This is believed to be a significant advance in the art since the luminous source and target are entirely independent, and the systems used to analyze the video signal need be concerned virtually entirely with determining the target position.

FIG. 5A is a side sectional view of another embodiment of the invention. A housing 14 contains a video camera 15 which is behind a beamsplitter 16, such as a half silvered mirror. A lamp 17 is located preferably at the focus of a parabolic reflector 18, for reflecting light from the lamp 17 directionally toward beamsplitter 16. The light is deflected from the beamsplitter 16 outwardly toward a target along the axis of the camera 15.

A light shield 19 blocks all of the light passing from the lamp and reflector to the beamsplitter 16 except that which passes through particularly located holes in the light shield. These holes can be round or arc shaped, but are symmetrically distributed within each of a pair of concentric rings located around the axis of the reflector-lamp combination, which axis intersects the camera axis at the beamsplitter 16. Thus the axis of the rings coincides with the axis of the camera following deflection of the light in beamsplitter 16. It should be noted that the luminous points can be part of concentric fully open circular rings.

FIG. 5B illustrates the front of the camera, and in particular the shape of the source as reflected in beamsplitter 16. The front of the camera housing 14 is opaque, and contains an annular hole 20, through which the source illumination emanates, and reflected light is received. Beamsplitter 16 deflects the light received from lamp 17 and reflector 18. Due to the light shield 19, the light source from which beamsplitter 16 receives light is in the form of arc shaped sections of two concentric rings, in this example, formed of the arc shaped points of an inner ring 12, and the arc shaped points of an outer ring 13, symmetrically located around a central axis 21. The central axis 21 is coincident with the camera axis.

Of course, if the design requires it, the aforenoted coincident axes can be similarly created by additional reflecting means. For example the camera 15 can be located at an angle to the central axis 21 provided suitable reflectors are used in a way which will be evident to a person skilled in the art.

As indicated earlier, the mean radius of the inner one of the rings of which the arc shaped points of the inner ring 12 are part, must be smaller than the mean radius of the outer one of the rings of which the arc shaped points of the outer ring 13 are part, by a factor of about 1.6. The luminous intensity of the inner ring should be lower than that of the outer ring by a factor of about 2.56, and the radial width of each of the rings, of which the arc shaped points 12 and 13 are part, should be approximately equal to or smaller than 0.2 times the mean radius of the corresponding ring.

The highest possible specific luminance retroreflective material is preferred to be used as a target. A useful target material is 3M 7610 high gain material, which is indicated as having a specific luminance of 500 cd/m$^2$/lux. Other retroreflective materials which may be used include 3M 7615 high contrast, 3M 3871 high intensity and other types of silver or white high intensity grade 3M Scotchlite reflective sheeting.

It is preferred that the retroreflective material should have a self-adhesive backing, for easy application either to a single location or in an array on an object to be targeted.

FIGS. 6A and 6B illustrate two different high performance types of retroreflective material. As shown in the sectional views forming FIGS. 6A and 6B, lenses are formed using small spherical beads 22 of optical grade material. The light passes into each of the lens beads, is totally internally reflected, and passes out of each bead along an axis which is parallel to the incident axis. In FIGS. 6A and 6B the specific lens bead elements are adherent to a plastic film 24 with parts of the lens elements exposed. In FIG. 6A a protective plastic sheet 25 covers the lens array. In FIG. 6B they are exposed.

Commercial examples of some of the above-described retroreflective sheeting will be recognized as being used as movie screens.

The above-described invention is thus believed for the first time to provide a constant target luminance with distance of a luminous source from retroreflective target material utilizing a constant light source. In general, thus the invention is a luminous source for illuminating a retroreflective sheet for reception of reflected light by a camera, in which the luminous source has constant light output and is located adjacent to the camera axis. The shape of the source is such as to generate constant reflected target luminance along the axis with varying distance of the target from the luminous source. As discussed earlier, constant target luminance is maintained at off-axis target positions if the source plane is close to the plane of the lens diaphragm.

A substantial reduction in cost of the system thus results, a decrease in size and weight, an increase in reliability (since there are fewer parts to fail), and which can provide an improved sensor response time since large swings in scene luminance are avoided.

While the above has described several embodiments of the invention, a person skilled in the art understanding this description may now conceive of other alternative embodiments using similar principles. All are considered to be within the sphere and scope of the invention as defined in the claims appended hereto.

We claim:

1. A luminous source for illuminating a target, comprising at least several luminous points symmetrically distributed within each of a pair of concentric rings for mounting coaxially with a camera axis close to the plane of its lens diaphragm, the mean radius of an inner one of the rings being smaller than the means radius of the outer one of the rings by a factor of about 1.6, the luminous intensity of the inner ring being lower than that of the outer ring by a factor of about 2.56, the radial width of each of the rings being no greater than approximately 0.2 times the mean radius of the corresponding ring.

2. A luminous source as defined in claim 1 in which the pair of coaxial rings are formed as full annular rings.

3. A luminous source as defined in claim 1 in which the luminous points are formed as arcs forming parts of said rings.

4. A source as defined in claim 1 comprised of a beamsplitter located in the camera axis for allowing reflected light from a target to pass through to the camera, and a light source for forming said luminous points located off the axis of the camera for transmitting light to the beamsplitter for reflection at locations defining said rings when viewed along said axis, along said camera axis to the target.

5. A source as defined in claim 4 in which the beamsplitter is a half silvered mirror.

6. A source as defined in claim 1 in which the source is comprised of at least one lamp, a reflector disposed behind the lamp, and a light shield enclosing the lamp in front of the reflector, the light shield containing a plurality of orifices of the size and shape of said luminous points.

7. A source as defined in claim 6 in which the light source is further comprised of a cylindrical tunnel having an axis coincident with the axis of the source for allowing reflected light from said target to pass therethrough along said axis to a camera.

8. A source as defined in claim 6 further including a beamsplitter for intersecting the camera axis for allowing reflected light from a target to pass through to the camera, and a light source for forming said luminous points located off the axis of the camera for transmitting light to the beamsplitter for reflection at locations defining said rings when viewed along said axis, along said camera axis to the target.

9. A luminous source for illuminating a target which provides reflected light for reception by a camera, the luminous source having constant light output, the luminous source being of predetermined shape so as to illuminate the target producing virtually constant target luminance with varying distance of the target from the luminous source, the source being symmetrically distributed around the camera axis.

10. A source as defined in claim 9 in which the source is comprised of at least several luminous points symmetrically distributed in a pair of concentric rings around said axis.

11. A source as defined in claim 10 in which the mean radius of an inner one of the rings is smaller than the means radius of the outer one of the rings by a factor of about 1.6, the luminous intensity of the inner ring being lower than that of the outer ring by a factor of about 2.56, the radial width of each of the rings being not greater than approximately 0.2 times the mean radius of the corresponding ring.

12. A source as defined in claim 11 in which the luminous points are in the shape of arcs symmetrically disposed around said axis.

13. A source as defined in claim 12 in which the luminous points are in the shape of continuous rings around the axis.

14. A photogrammetry system comprising a retroreflective sheet target for reflecting incident light for reception by a video camera, a luminous source having constant light output for providing said incident light, the source being located to provide said incident light along and around the axis of the camera, the luminous source being of predetermined shape so as to illuminate the target producing virtually constant target luminance with varying distance of the target from the luminous source.

15. A system as defined in claim 14 in which the luminous source is comprised of at least several luminous points symmetrically distributed within each of a pair of concentric rings located coaxially with the camera axis, the mean radius of an inner one of the rings being smaller than the mean radius of the outer one of the rings by a factor of about 1.6, the luminous intensity of the inner ring being lower than that of the outer ring by a factor of about 2.56, the radial width of each of the rings being approximately equal to or smaller than 0.2 times the mean radius of the corresponding ring.

16. A system as defined in claim 15 further including a beamsplitter intersecting the camera axis for allowing reflected light to pass through to the camera, and said luminous source being located off the axis of the camera for transmitting light to the beamsplitter for reflection at locations defining said rings when viewed along said axis, along said camera axis to the target.

17. A system as defined in claim 15 in which the luminous source is comprised of at least one lamp, a reflector disposed behind the lamp, and a light shield enclosing the lamp in front of the reflector, the light shield containing a plurality of orifices of the size and shape of said luminous points.

18. A system as defined in claim 17 in which the luminous source is further comprised of a cylindrical orifice tunnel having an axis coincident with the axes of the camera and luminous source for allowing reflected light from said target to pass therethrough along said axes to said camera.

* * * * *